Nov. 11, 1924.

H. FORD

PISTON RING

Filed Sept. 26, 1919

1,515,246

Inventor
Henry Ford,
By
Attorneys

Patented Nov. 11, 1924.

1,515,246

UNITED STATES PATENT OFFICE.

HENRY FORD, OF DEARBORN, MICHIGAN.

PISTON RING.

Application filed September 26, 1919. Serial No. 326,578.

*To all whom it may concern:*

Be it known that I, HENRY FORD, a citizen of the United States of America, residing at Dearborn, in the county of Wayne and State of Michigan, have invented certain new and useful Improvements in Piston Rings, of which the following is a specification, reference being had therein to the accompanying drawings.

The object of my invention is to increase the resiliency or packing qualifications of a piston ring or split member, by weakening portions of the ring or member, so that it possesses a greater tendency to distend when in a restricted space. This object is obtained without adding anything to the ring or member, and without changing the exterior dimensions of the ring or member, which are uniform throughout the circumference of the ring, thus facilitating manufacture.

The above object may also be attained by an operation on the stock or body from which the ring is made prior to the ring being split or completed, and as a result of my invention there is produced a ring or member which will insure a more positive packing, for instance, between a piston and cylinder wall, than other one-piece rings.

The mechanical construction by which I attain the above and other objects will be hereinafter considered and then claimed, and reference will now be had to the drawing, wherein—

Figure 1:
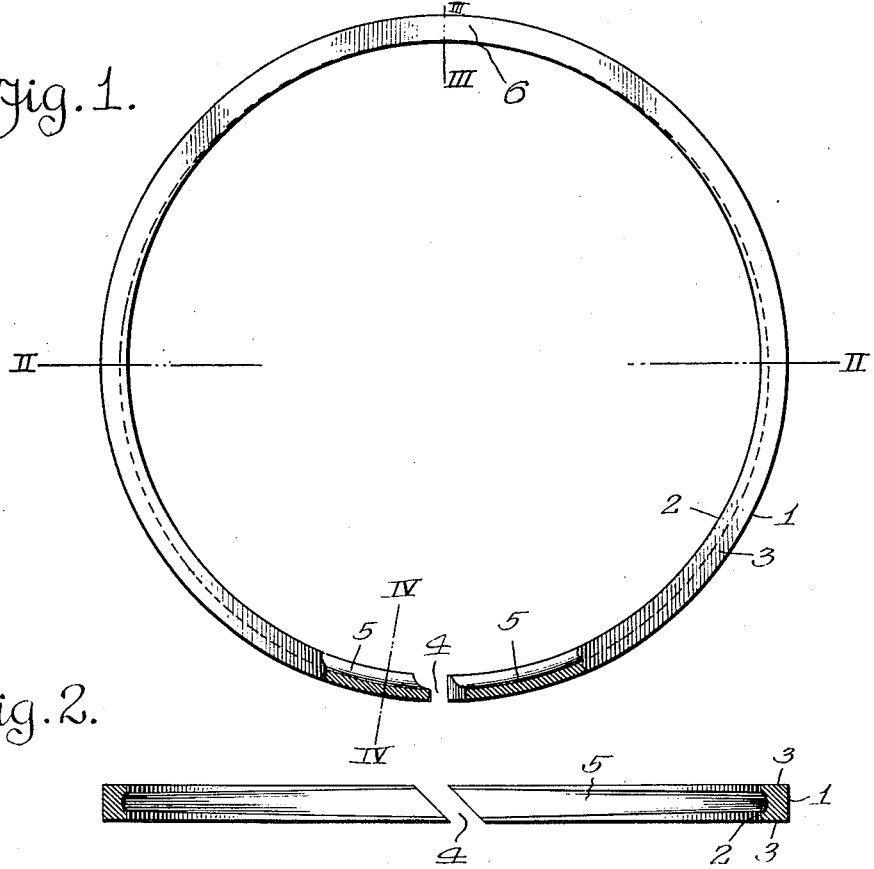
Figure 1 is a plan of the piston ring, partly in section.
Figure 2:
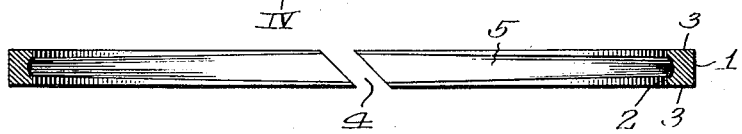
Fig. 2 is a cross sectional view taken on the line II—II of Fig. 1, looking towards the split or severed portion of the ring.
Figure 3:
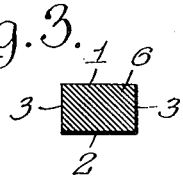
Fig. 3 is a cross sectional view of the middle portion of the ring, taken on the line III—III of Fig. 1.
Figure 4:
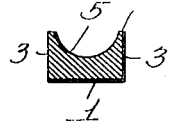
Fig. 4 is a similar view taken on the line IV—IV of Fig. 1.

A piston or packing ring in accordance with my invention comprises an annulus or circular member having an outer wall 1 and an inner wall 2 concentric of said outer wall, and walls 3 which are in parallel planes so that the walls 1, 2 and 3 may cooperate in providing an annulus which has a uniform cross sectional area throughout its circumference, in contradistinction to those rings of the "eccentric" type.

The ring is split or severed on a bias or at an angle to the planes of the walls 3, as indicated at 4, and sufficient material is removed to permit of the ring being retracted or distended from its original annular shape.

The inner wall 2 of the ring is provided with grooves 5 extending from the split ends of said ring to the middle portion 6 thereof, said grooves having their greatest depth at the split ends of the ring and gradually tapering or decreasing in depth towards the middle portion 6 of the ring, where the grooves merge into the inner wall of said ring. In grooving or recessing the inner wall 2 of the ring it is apparent that material is removed from the split ends of the ring and consequently these ends are weakened to a greater extent than other portions of the ring, so that the split ends will have the resiliency thereof increased and may be more easily flexed than if the ring was of a uniform cross sectional area throughout.

As set forth in the beginning the grooving or recessing of the ring may be done in the stock or body of material from which the ring is produced, prior to splitting or severing said ring, although it is to be understood that this operation may be performed even after the ring is split or severed.

Since a series of recesses in the inner wall of the ring may accomplish the same result or purpose as the grooves 5, I do not care to confine my invention to the manner of weakening the ring other than defined by the appended claims.

As will be understood, the form of ring shown, whether the recessing of the inner face be by a continuous groove or in the form of a succession of depressions differing in width at the meeting points of the wall configuration of the recessed portion and the inner periphery of the ring, provides a construction in which the depth of the recesses vary, but also a construction in which the configuration of the inner face is formed of the medial depressed portion extending in the direction of length of the ring from the split and the two surfaces at the sides of the depression, these surfaces increasing in width in the direction leading away from the split.

As a result the progressive ratio of increase of resistance to resilient action is of sufficiently high degree—due to the fact that the increase of metal is not only at the bottom of the groove but also at the sides—as to insure proper action, such arrangement permitting the recessed portion at each side of the strip to extend a distance to even approach or reach the side of the ring opposite the split. Obviously, a ring of this type will provide for greater uniformity in action, since the cross-sectional change extends practically throughout the length of the ring instead of being confined to a more or less limited zone. This is brought about by varying the configuration in at least two dimensions—width and depth—on different cross-sections of the ring on the same side of the split. With the series of depression type the progressive increase in resistance to resiliency is more or less zonal in type, while in the continuous groove type of ring, the increase is uniform.

What I claim is:—

1. A split piston ring having its opposite side faces of substantially uniform radial dimensions throughout the length of the ring, and having its inner face recessed with respect to the periphery forming the inner diameter of the ring, the portion of the recess at one cross-section of the ring differing in the dimensions of width and depth from that at another cross-section of the ring on the same side of the split, the maximum width of the recess being less than the overall width of such inner face with the recess spaced from such opposite side faces, said recess extending to and being exposed on the surface of the split.

2. A ring of the type of claim 1 characterized in that the change in the two dimensions is of a width and depth decreasing order in succeeding cross-sections of the ring leading from the split.

3. A ring of the type of claim 1 characterized in that the recessed zone at a side of the split extends approximately to the portion of the ring diametrically opposite the split, and that the change in the two dimensions is of width and depth decreasing order and continuous throughout the length of the recessed zone.

4. A split piston ring having its inner face recessed with respect to the periphery forming the inner diameter of the ring, with the contour of a cross-section of the recess extending in a continuous curve intersecting the line of such inner periphery, the depth of the recess and the recess width at the line of intersection on one cross-section of the ring differing from that on a succeeding cross-section of the ring on the same side of the split.

In testimony whereof I affix my signature in the presence of two witnesses.

HENRY FORD.

Witnesses:
E. G. SIEBOLD,
FRANK CAMPSALL.